Jan. 20, 1959

A. W. LEMMON 2,869,380

CHAIN LINK BEARING MEANS

Filed March 23, 1956

INVENTOR;
ALEXIS W. LEMMON,
BY
ATT'Y.

United States Patent Office 2,869,380
Patented Jan. 20, 1959

2,869,380

CHAIN LINK BEARING MEANS

Alexis W. Lemmon, Columbus, Ohio, assignor to The Jeffrey Manufacturing Company, a corporation of Ohio Application March 23, 1956, Serial No. 573,395

2 Claims. (Cl. 74—245)

The instant invention relates to chains and, more particularly to an improved chain link which includes means for supporting the chain link on a sprocket wheel or like means.

It is the prime object of the instant invention to provide an improved chain link having means for supporting the chain link on a sprocket wheel, and to distribute the forces acting on the chain link so as to reduce the wear thereof and to achieve more efficient operation of the chain.

It is a further object of the instant invention to provide an improved chain link having bearing surfaces which are adapted to ride on a wheel, to support the chain link on the wheel and to distribute the load on the chain link for the purpose of reducing the wear of the chain link and to thereby extend the useful life thereof.

It is another object of the instant invention to provide a novel chain link which includes bearing surfaces adapted to ride on a sprocket wheel or like means for supporting the link on the wheel, in which the bearing surfaces are formed on both sides of the chain link so that the chain link can be reversed for use of the chain on either side thereof.

It is still another object of the instant invention to provide an improved chain link in which the opposite longitudinally extending edges of each of the side bars of the chain link are formed with bearing surfaces adapted to engage and ride on complementally formed supporting surfaces of a wheel or the like, in which the chain link can be reversed and operated on either side thereof.

It is also an object of this invention to provide an improved chain for use with a sprocket wheel in which each chain link comprises laterally spaced apart side bars for the reception of the teeth of the sprocket wheel, and the longitudinally extending edges of the side bars are curved to form bearing surfaces adapted to engage and ride on complementally formed annular rims located on the sprocket wheel at either side of the sprocket teeth, for supporting the chain links on the sprocket wheel and to distribute the load on the chain links so as to reduce the wear thereof whereby the useful life of the chain is materially extended, and also permitting the chain to be reversed for still further use of the chain after the first used side of the chain is worn to the extent that it no longer operates satisfactorily.

Other objects of the invention will appear hereinafter, the novel features and combinations being set forth in the appended claims.

Figure 4:
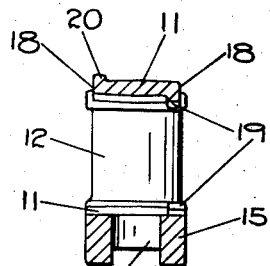
Fig. 4 is a sectional view of the improved chain link taken on line 4—4 in Fig. 3.
Figure 3:
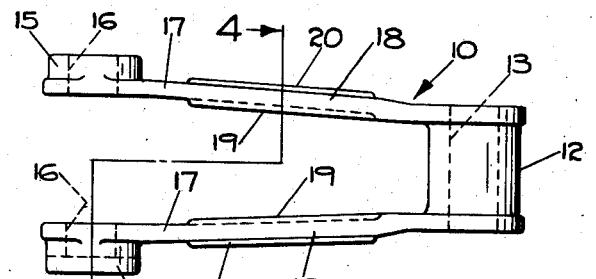
Fig. 3 is a plan view of the improved chain link.
Figure 1:
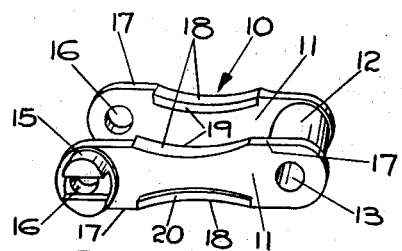
Fig. 1 is a perspective view of an improved chain link formed in accordance with the instant invention.

Referring to Fig. 1 of the drawings, there is illustrated an improved chain link 10 formed in accordance with the instant invention. The chain link 10 comprises longitudinally extending side bars 11, laterally spaced one from the other for the reception therebetween of the teeth of a sprocket wheel 21, as will be explained in greater detail below. A laterally extending cylindrical barrel 12 spans the distance between the side bars 11 at one end thereof, and is formed with a bore 13 extending therethrough and through the ends of the side bars 11 for the reception of a pin 14 to connect the chain link 10 to a similar chain link in an endless chain, the pins 14 forming articulated joints between the successive chain links of the chain.

The side bars 11 diverge slightly from the barrel 12 towards the opposite end of the chain link 10 for the reception therebetween of the barrel end of an adjacent chain link in the chain. Integral collars 15 are formed on the outer face of each of the side bars 11 at the open end of the chain link 10, and include bores 16 for the reception of a transversely extending pin 14 which is also received in the bore 13 in the barrel and of an adjacent chain link. In this manner a plurality of chain links 10 are successively connected, one to the other, and the pins 14 intermediate the adjacent chain links form articulated joints between the successive chain links and provide the requisite flexibility of the chain in a vertical plane.

The opposite longitudinally extending edges 17 of each of the side bars 11 are formed with bearing surfaces 18 which are curved inwardly toward each other. The bearing surfaces 18 are formed complementally to a curved annular supporting surface on the sprocket wheel with which the chain link 10 is adapted to cooperate, whereby the chain link is supported on the sprocket wheel 21 by engagement of the bearing surfaces 18 on the opposite side bars 11 with the complementally formed supporting surface of the sprocket wheel.

Figure 2:
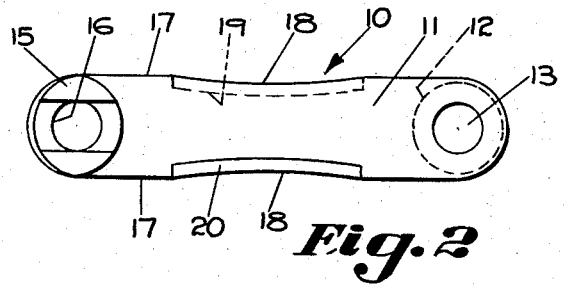
Fig. 2 is a side elevational view of the chain link shown in Fig. 1.

At the top of the chain link 10, as viewed in Figs. 1 and 2, the bearing surface 18 on the opposite side bars 11 includes extensions 19 projecting inwardly from the side bars 11 and laterally of the plane thereof. The bearing surface extensions 19 are formed as flanges on the longitudinally extending edges 17 of the side bars 11 and reinforce the bearing surfaces 18 by increasing the wearing area thereof.

At the bottom of the chain link 10, as viewed in Figs. 1 and 2, the bearing surfaces 18 are similarly formed with extensions 20 which project outwardly from the side bars 11 and laterally of the plane thereof. The bearing surface extensions 20 are also formed as flanges on the outer face of the side bars 11, and serve the function of increasing the wearing area of the bearing surfaces 18 at the bottom of the chain link 10.

Figures 5, 6:
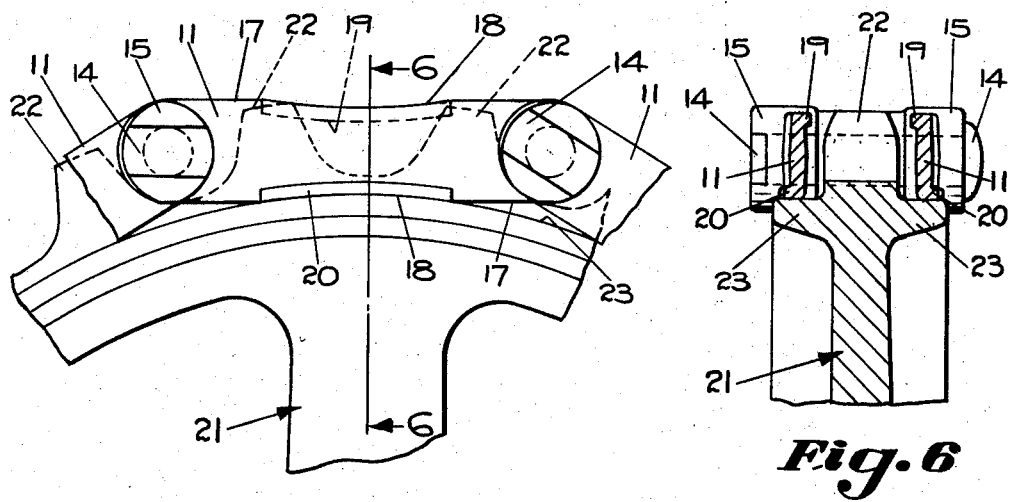
Fig. 5 is a partial elevational view showing the use of the improved chain link of this invention with a sprocket wheel.
Fig. 6 is a sectional view showing the improved chain link of this invention on a sprocket wheel and taken on line 6—6 in Fig. 5.

The particular chain link 10 illustrated in the drawings is adapted to form one link of a chain which is specifically designed for operation with a sprocket wheel 21, as illustrated in Figs. 5 and 6, although it will be apparent to those skilled in the art that the invention is equally applicable to other forms of chain as well. The sprocket wheel 21 includes sprocket teeth 22 formed on the periphery thereof and adapted to engage with the barrels 12 of the successive chain links for driving the chain or to be driven by the chain, in the usual manner known in the art. The sprocket wheel 21 further includes annular rims 23 below the sprocket teeth 22 and projecting laterally to either side of the sprocket teeth 22 to form chain link supporting surfaces. The bearing surfaces 18 on the individual chain links 10 are complementally formed with respect to the annular rims or supporting surfaces 23.

Accordingly, as the chain links 10 ride on the sprocket wheel 21 the bearing surfaces 18 will seat on the annular supporting surfaces 23 and engage therewith. Thus the forces acting on the chain links are distributed on the bearing surfaces 18 as well as on the areas of contact between the barrels 12 and the sprocket teeth 22. In this manner the load is distributed over a relatively large area materially reducing the wear on the links and greatly extending the life thereof, as well as increasing the efficiency of operation by virtue of the positive manner in which the chain links seat on the sprocket wheel and are supported by the annular rims 23 of the sprocket wheel. As a further result of the manner in which the forces are distributed, the wear on the sprocket wheel 21 is also reduced, since the load that is normally carried by the sprocket teeth 22 where they engage the barrels 12 of the chain links 10 is now distributed also on the annular rims or supporting surfaces 23.

Since the side bars 11 are formed with bearing surfaces 18 on each of the opposite longitudinally extending edges 17, the chain may eventually be reversed and operated on the unworn bearing surfaces 18. As a result of such reversal of the chain the useful life thereof is effectively doubled.

In accordance with the instant invention there is provided an improved chain link including bearing and wearing surfaces adapted to engage and mate with complementally formed supporting surfaces on a sprocket wheel on which the chain rides. The bearing surfaces are formed on both sides of the novel chain link so that it may be reversed for use on the opposite side thereof. The chain link construction of this invention provides a structure in which the loads on the chain are distributed on large areas, whereby the wear which normally occurs in the areas of contact between the sprocket teeth and the barrels of the chain links is materially reduced by being transferred to bearing surfaces which ride on complementally formed supporting surfaces of the sprocket wheel, thereby achieving a material increase in the useful life of the chain, as well as the efficiency with which it operates.

Obviously, those skilled in the art may make various changes in the details and arrangements of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. An integral chain link having longitudinally extending side bars laterally spaced from each other for the reception therebetween of the teeth of a chain sprocket, the opposite longitudinally extending edges of each of the chain link side bars comprising bearing surfaces for supporting the link on the sprocket, and laterally extending flanges on each of said longitudinally extending edges reinforcing the bearing surfaces, said flanges on the opposite edges of each side bar extending to opposite sides of the side bar.

2. The combination of a chain and a sprocket wheel wheel on which said chain rides including sprocket teeth on the periphery of the wheel and a laterally projecting annular rim at each side of the sprocket teeth for supporting the chain, said chain comprising a succession of articulated links, each chain link being integrally formed, each link having longitudinally extending side bars laterally spaced from each other for the reception of the sprocket teeth therebetween, the opposite longitudinally extending edges of each of the chain link side bars being curved complementally to the annular rims to form bearing surfaces engaging the rims for supporting the links on the wheel, and laterally extending flanges on the side bars forming extensions of the bearing surfaces and reinforcing the bearing surfaces, said flanges on the opposite edges of each side bar extending to opposite sides of the side bar.

References Cited in the file of this patent

UNITED STATES PATENTS

| 581,689 | Brown | May 4, 1897 |
| 586,991 | Curley | July 27, 1897 |
| 1,100,148 | Perry | June 16, 1914 |
| 1,308,843 | Davis | July 8, 1919 |
| 1,508,446 | Diehl | Sept. 16, 1924 |
| 2,301,330 | Schafer | Nov. 10, 1942 |
| 2,412,364 | Sivyer | Dec. 10, 1946 |
| 2,625,830 | Transeau | Jan. 20, 1953 |

FOREIGN PATENTS

| 26,780 | Great Britain | of 1902 |